July 18, 1950        G. B. LOPER        2,515,456

MODULATION-FREE GAIN CONTROL SYSTEM

Filed March 20, 1946        3 Sheets-Sheet 1

INVENTOR.
GEORGE B. LOPER
BY
Sidney A. Johnson
ATTORNEY

July 18, 1950

G. B. LOPER 2,515,456

MODULATION-FREE GAIN CONTROL SYSTEM

Filed March 20, 1946

INVENTOR.
GEORGE B. LOPER
BY
Sidney A. Johnson
ATTORNEY

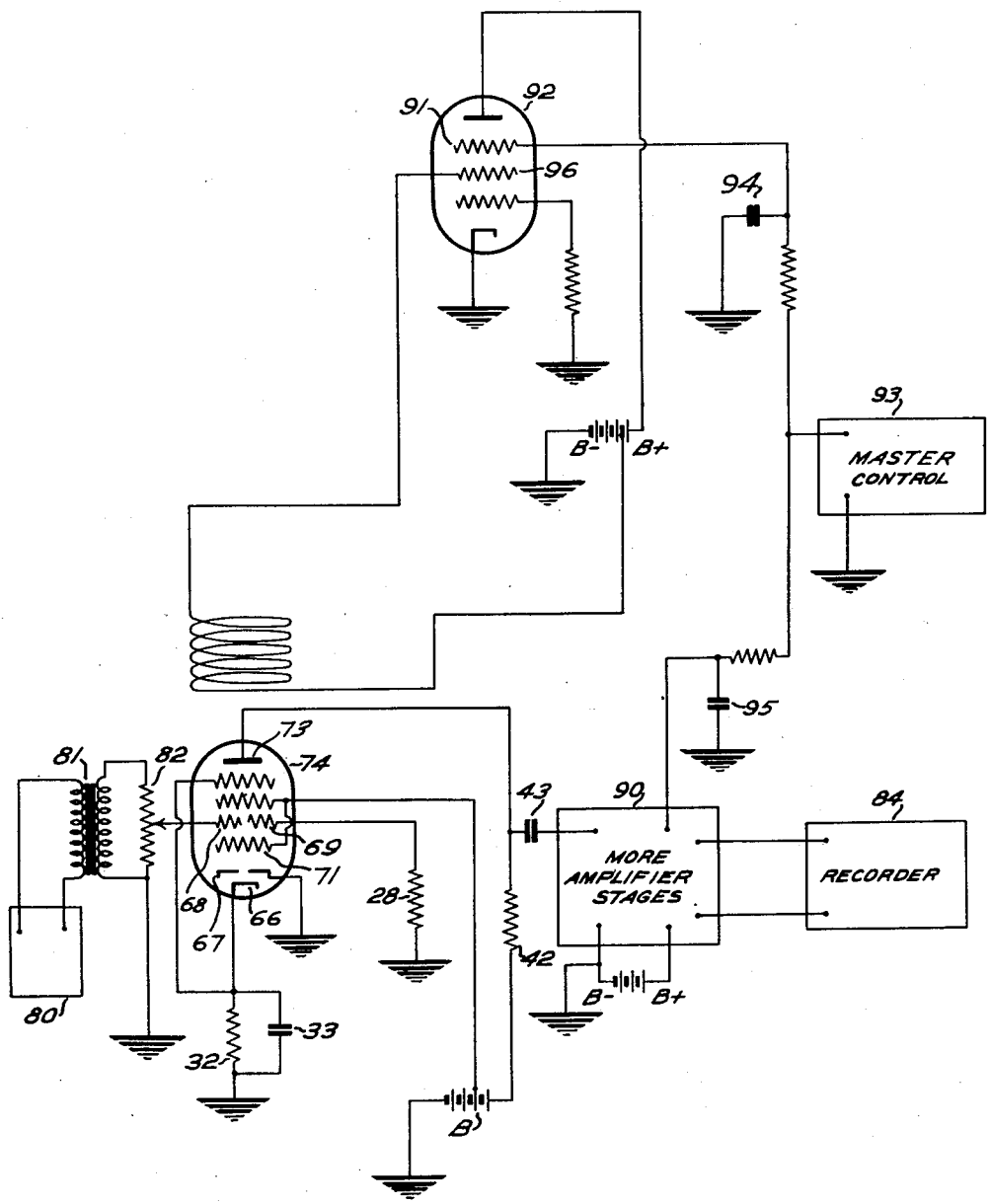

Patented July 18, 1950

2,515,456

UNITED STATES PATENT OFFICE 2,515,456

MODULATION-FREE GAIN CONTROL SYSTEM

George B. Loper, Dallas, Tex., assignor, by mesne assignments, to Socony-Vacuum Oil Company, Incorporated, New York, N. Y., a corporation of New York Application March 20, 1946, Serial No. 655,663

14 Claims. (Cl. 179—171)

1

The present invention relates to a signal control circuit, and more particularly to a signal control circuit for use with electric seismographs.

In seismic prospecting systems, artificial seismic waves are generated upon detonation of a charge of explosive in a shot hole. The seismic waves reflected from the sub-surface horizons and interfaces are picked up by a spread of geophones. Since the reflected waves reach different geophones at different times, the seismogram may be interpreted by computation for plotting a diagram of the sub-surface strata and a contour of the interfaces. Since it is necessary to determine with reasonable accuracy the time interval between the instant of detonation of a shot hole charge and the reception of the various waves by different geophones, it has been customary to have the signal amplifier set for maximum gain. With the amplifier set for maximum gain, the initial movement of the oscillographic element produces a sharp break in the seismogram, thereby minimizing the necessity to estimate the precise instant at which the oscillographic elements first began to move. This first movement is obtained as a result of the reception of the direct traveling wave.

Subsequent to the reception of the initial direct wave, a series of reflected waves are received. Since the first reflected waves are of higher amplitude than succeeding waves, it has been customary to reduce the gain of the amplifier and subsequently increase the gain as a function of time. It has been found, however, that changing the gain of the amplifier introduces modulation or distortion of the waves received.

In the application of gain control to radio receivers, the audio or radio frequencies of the signals are at frequencies relatively high compared to the low frequency of the automatic gain control voltage. In seismographic recording, however, the seismic signals are relatively low in frequency and have a frequency comparable to that of the undesired signal obtained from the gain control voltage. Whereas in radio receivers a simple filter arrangement will substantially eliminate the unwanted gain control signal from the output, a simple filter circuit will not eliminate the undesired gain control signal from the amplifier output in a seismographic apparatus. It, therefore, would be desirable to provide a signal transmission circuit for gain control apparatus which will provide a relatively wide variation of the control of the amplitude of the signal to be recorded without introducing modulation or undesired signal by means of a change in gain control voltage.

In accordance with the present invention, an electronic gain or signal control circuit is obtained for operation in a seismographic apparatus which controls or varies the magnitude of the signals transmitted thereby without introducing a modulation of the signals. In the heretofore mentioned arrangements, where after the reception of the direct traveling wave the gain of the amplifier was sharply reduced, the voltage of the anode circuit changed potential with respect to ground due to the sudden plate current reduction through the load impedance. Since such amplifiers are commonly of the resistance-capacitance coupled type, the coupling capacitor had to be charged to the new potential through the grid resistor of the following stage of amplification, with the result that the grid of the succeeding stage was driven sufficiently far from normal bias as to introduce distortion and, in some instances, block the transmission of signals. In accordance with the present invention, the voltage or potential of the output coupling point in the anode circuit is maintained at a constant average potential throughout all gain variations. This is accomplished by a control circuit wherein the average anode current remains relatively constant even though the gain of the tube is varied over wide limits.

It is, therefore, an object of the present invention to provide an improved signal control circuit.

It is a further object of the present invention to provide a signal transmission circuit having a wide range of gain control which does not introduce into the signal output any components corresponding to the gain control voltage.

It is a still further object of the present invention to provide an improved signal transmission circuit particularly adapted for the controlling of amplitude of the signals in a seismographic recording system.

Other and further objects of the present invention subsequently will become apparent by reference to the following description taken in conjunction with the accompanying drawings in which:

Fig. 1 diagrammatically illustrates the internal construction of a vacuum tube having the desired characteristics of operation suitable for use in conjunction with the present invention;

Fig. 2 is a circuit diagram illustrating the present invention;

Fig. 3 diagrammatically illustrates the electrode arrangement of a suitable form of vacuum tube having the required operating characteristics;

Fig. 7 diagrammatically illustrates another embodiment of the invention; and

Figure 6:
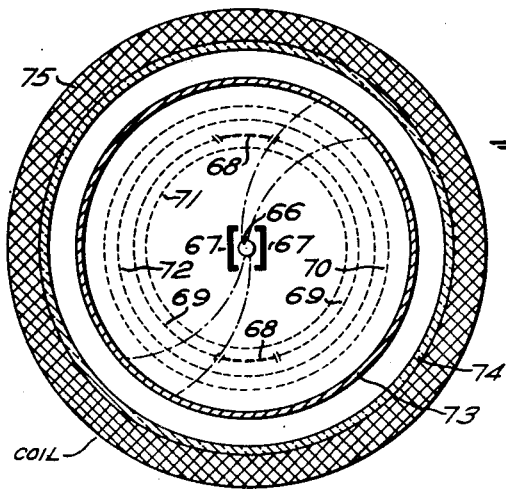
Fig. 6 shows another vacuum tube construction having the desired characteristics.

Fig. 8 illustrates an application of the vacuum tube of Fig. 6 in accordance with the present invention.

Figure 1:
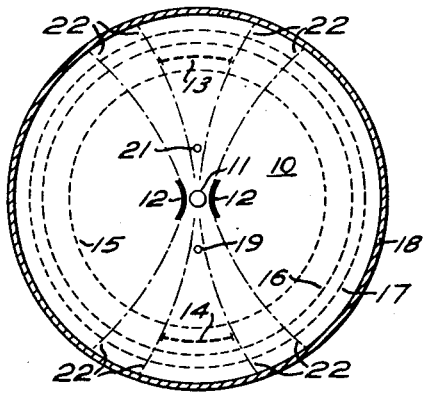

Referring to the drawings, a vacuum tube 10 having a characteristic of constant plate current irrespective of the gain control voltage applied thereto is diagrammatically represented in Fig. 1. The vacuum tube 10 is provided with a cathode 11 having positioned on both sides thereof electron beam forming plates 12 so as normally to direct an electron beam toward a pair of grids 13 and 14. The grids are surrounded by concentric screen grids 15 and 16. A cylindrical suppressor grid 17 surrounds the grids and is surrounded by an anode 18. The enclosure has been omitted. Between the cathode 11 and the control signal grids 13 and 14, there are provided a pair of gain control rods 19 and 21. These gain control rods when there is no potential applied thereto have no effect upon the electron beam 22. When, however, a negative potential with respect to the cathode is applied to these rods, electron beams are deflected, as shown, to either side in passing the gain control rods. Thus, the gain control rods 19 and 21 cast an electron shadow upon the signal grids 13 and 14 so that a lesser amount of the energy of the electron beam 22 impinges upon these signal grids. The electron beam 22, however, is not diminished so that the number of electrons reaching the anode 18 remains constant, thereby providing a constant plate current characteristic for the vacuum tube 10. As the potential on the gain control rods 19 and 21 varies, the grid plate transconductance also varies. By proper design the gain control rods 19 and 21, with adequate negative bias, will sufficiently deflect the beam 22 so that practically none of it will strike the signal grids 13 and 14 thus making it possible to control the signal output of the vacuum tube between a maximum value and a minimum value which is sbstantially zero.

Figure 2:
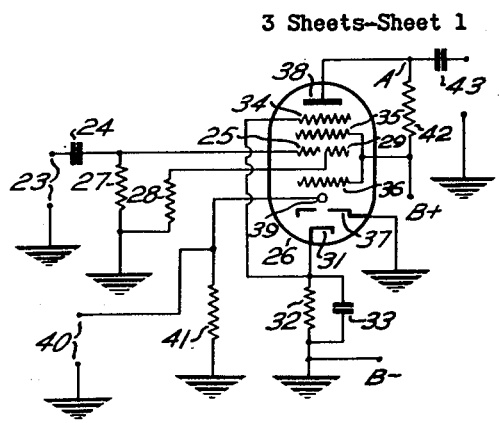

For the purpose of controlling the magnitude of the signal transmitted by an amplifier as desired in the case of seismographic amplifiers, a stage of amplification generally corresponding to that shown in Fig. 2 is provided, and is preferably located in the proximity of the amplifier input. A pair of input terminals 23, one of which is connected to ground, is provided for the application of seismic wave signals. The ungrounded terminal 23 is coupled through a capacitor 24 to a signal grid 25 of a vacuum tube 26. The grid resistor 27 is connected between the signal grid 25 and ground. A similar resistor 28 is connected between ground and a non-signal grid 29, which is in the same plane as the grid 25 (or in the cylindrical or concentric type structure, in the same radius from the cathode). The vacuum tube 26 has a cathode 31 which may be self-biased by a grounded resistor 32 by-passed by a capacitor 33. The cathode is connected to a suppressor grid 34. The signal grid 25 and the non-signal grid 29 are positioned between screen grid structures 35 and 36. Positioned in the proximity of the cathode 31 is an electron beam forming structure 37 having an aperture for the electron beam which moves on to the anode 38 of the vacuum tube 26. Positioned within the electron beam stream is a gain control rod or electrode 39 which is connected to a grounded resistor 41. The anode 38 of the vacuum tube 26 has an anode circuit resistor 42 connected to the positive terminal of a suitable source of anode voltage. The anode 38 is coupled by a capacitor 43 to a succeeding stage of amplification. The screen grids 35 and 36 are also connected to a source of anode potential.

Figure 3:
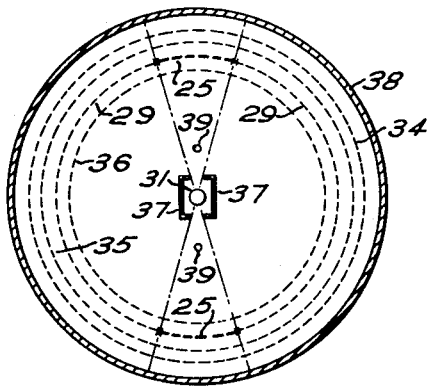

In the circuit arrangement shown in Fig. 2, it will be noted that between the screen grids 35 and 36 there are positioned two grids 25 and 29. One manner in which such structure may be embodied in the vacuum tube is diagrammatically illustrated in Fig. 3, wherein corresponding elements have been given similar reference characters. In Fig. 3, the signal grid 25 is in two similar parts arranged on opposite sides of the cathode 31 which is surrounded by the beam forming element 37 having apertures on opposite sides of the cathode. Thus, actually the signal grid 25 may be said to constitute a pair of grids. Similarly, the non-signal grids 29 are formed in a pair of grids arranged at the same radius as the signal grids 25. Two gain control electrodes 39 are also provided on opposite sides of the cathode 31. When the pair of gain control electrodes 39 has no potential relative to ground, the rods 39 produce no effect upon the electron stream which is so beamed by the member 37 as to cover the arc of the signal grids 25. When a potential from the contacts 40 is applied across the resistor 41 so that the gain control rods 39 are negative relative to the cathode, the electron streams will be bifurcated or deflected by an amount proportional to the negative potential on the gain control rods. With a maximum negative potential on the gain control rods, the electron beams are bifurcated in a manner similar to that shown in Fig. 4 which shows that practically none of the electron beam strikes the signal grid 25 since these grids are in the electron shadows of the rods 39. The magnitude of the electron beam, however, is not affected so that the total or average anode current flowing remains the same. Thus, the point A in the circuit shown in Fig. 2 does not change in average voltage as the gain control voltage varies so that the coupling capacitor 43 does not have a change in average voltage. If the point A were to change in potential due to a drop of the current flowing through the resistor 42, a change of potential would exist between the two sides of the capacitor 43 which would have to be made up by current drawn through the grid coupling resistor of the succeeding stage of amplification. It is apparent that this current constitutes an unwanted, introduced signal. Since the grid coupling resistor is generally of relatively high value, it is apparent that the time constant of the circuit for recharging the capacitor 43 to a new value is relatively high so that the grid bias of the next succeeding stage would be changed. Any signal thereupon being passed by the amplifier becomes distorted in the next succeeding stage or may in some instances be completely blocked until the capacitor 43 becomes sufficiently charged. In the present instance, a variation of the gain control of the vacuum tube 26 produces no change in the average potential at the point A, with the result that the average potential across coupling capacitor 43 does not change. However, the instantaneous potential at the point A and on the capacitor 43 will vary with the instantaneous potential of the applied signals. The amplitude of signal variations appearing in the anode circuit of the vacuum tube 38 may vary in magnitude from substantially zero to a maximum, and yet the various stages of the amplifier will not be affected by the gain control potential applied.

Figure 4:
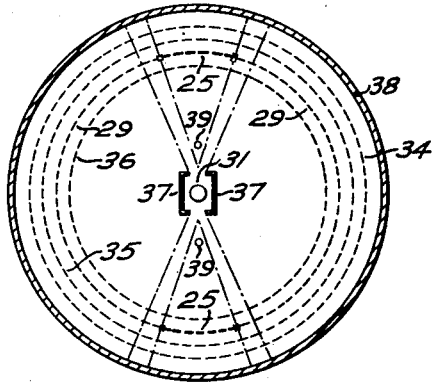
Fig. 4 is another diagrammatic view similar to Fig. 3 illustrating the operation of the vacuum tube under different conditions.

In the circuit arrangement shown in Fig. 2 and in the vacuum tubes diagrammatically illustrated in Figs. 3 and 4, it was shown that a gain control element could be utilized to deflect an electron beam from the signal grid. Another manner of accomplishing the same result is illustrated by the circuit diagram of Fig. 5, wherein there is provided a vacuum tube 44 having a cathode 45 provided with an electron beam forming element 46. This beam forming element 46 is connected to ground. The cathode 45 of the vacuum tube 44 may be self-biased by a grounded resistor 47 by-passed by a capacitor 48. The electron beam provided by the cathode and the forming structure 46 passes on to an anode 49. In the proximity of the anode there is provided a suppressor grid 51 which is, as is customarily the case, connected directly to the cathode 45. A screen grid structure which may be in two parts, 52 and 53, surrounds a signal grid 54 and a non-signal grid 55. The signal grid 54 is connected to a grid coupling resistor 56 which is grounded. The grid is directly coupled by a capacitor 57 to one of a pair of input terminals 58. The non-signal grid 55 is provided with a grid resistor 59 which also is connected to ground. Between the cathode and the screen grid structure, there are provided a pair of deflecting plates 61 and 62. These deflecting plates are connected to a gain control voltage, indicated by the terminals 40, so that these plates shift the direction of the electron beam 63 either upwardly or downwardly as seen in the circuit diagram of Fig. 5. When the beam is deflected upwardly by the application of a suitable potential to the plates 61 and 62, the principal energy of the electron beam passes through the signal grid 54. When the electron beam is deflected to a similar position downwardly, the electron beam does not strike the signal grid 54 but passes through the non-signal grid 55. For intermediate positions, the electron beam 63 will engage portions of both of the grids 54 and 55. Thus, a gain control potential may be applied to the vacuum tube 44 to maintain substantially constant the signal potential of the point A of the anode circuit which is coupled by a capacitor 64 to the grid of a succeeding stage of amplification. The anode 49 is connected through an anode circuit resistor 65 to a suitable source of potential, and the screen grid structure 52—53 is also connected to this source of potential.

By deflecting the electron stream from a path which includes a signal grid to a path which includes a non-signal grid, the impedance of the electron stream path is maintained constant so that constant anode current flows at all times. This characteristic satisfies the requirements of a gain control system for seismograph amplifiers, particularly wherein the gain must be quickly reduced through a very wide range after the first direct seismic waves are received. While the circuit has been described as being particularly adapted for this application, it will be appreciated that the circuit is also capable of being used in other applications such as use for a balanced modulator using a single-ended resistance-capacitance coupling which is capable of operating over a wide range of frequencies. Such modulator would incorporate all of the advantages of balanced modulators in the prior art which, however, required the use of push-pull circuits and transformer couplings. Furthermore, while one of the grids has been designated as a signal grid, and the other grid as a non-signal grid, it is to be understood that different signals might be used on each of the grids as is often the case in certain communication systems wherein it is desired to fade from one signal channel to the other. Such fading is employed particularly in radio and television communication. Still, in other instances it might be desirable to establish a particular balance such as a constant balance between the levels of two signals applied to the two grids. The particular balance selected might control a circuit to cause the application of a control or gain voltage so that the difference in signal levels would apply a corrective or compensating effect.

Figure 5:
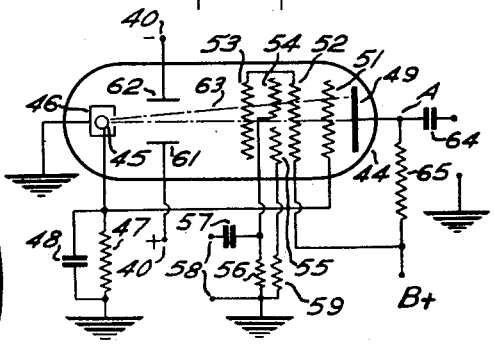
Fig. 5 is explanatory of still another vacuum tube construction and circuit embodying the principles of the present invention.
Figure 2:
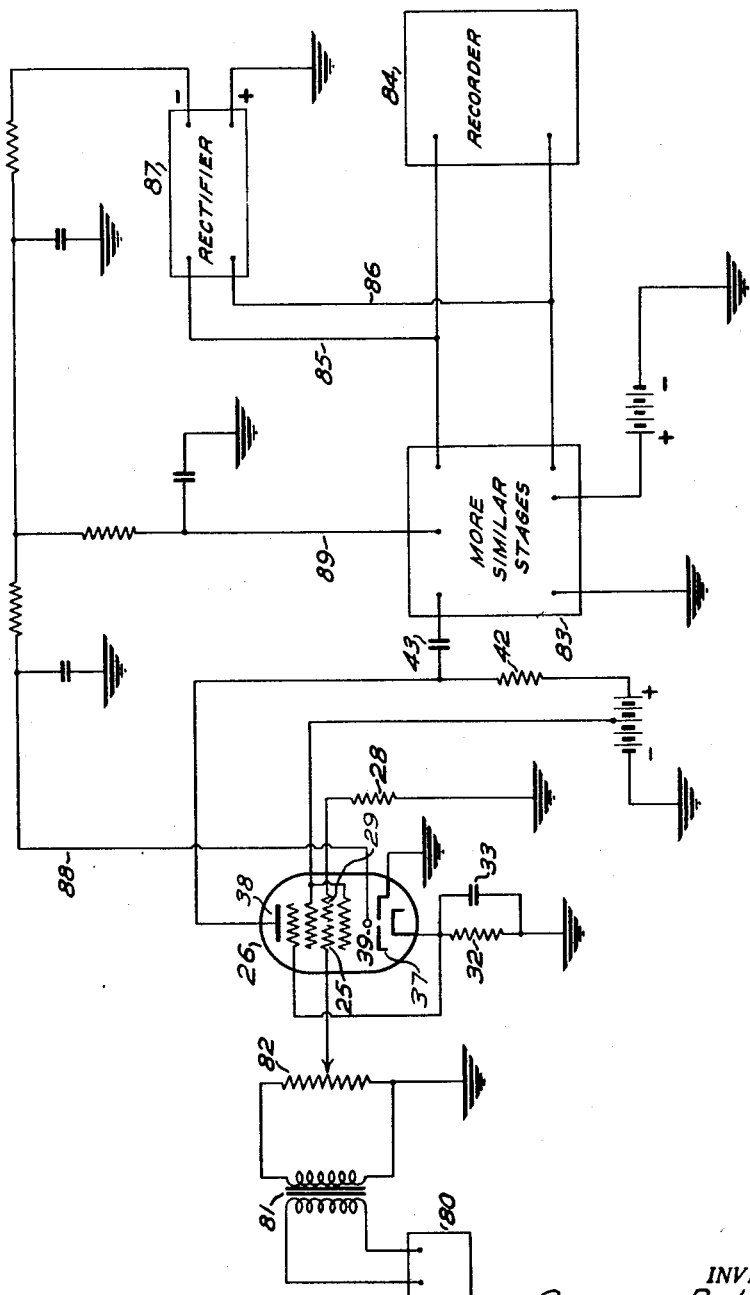

While in the circuit arrangements of Figs. 2 and 5 an electrostatic or potential effect has been employed for shifting the electron beam to and from the signal grids, other means such as a magnetic field may be employed. To illustrate this, there is shown in Fig. 6 a diagrammatic representation of a vacuum tube having a cathode 66 provided with a beam forming structure 67. A pair of signal grids 68 and a pair of non-signal grids 69 are enclosed between screen grids 71 and 72. A suppressor grid 70 and an anode 73 are provided within a glass envelope 74. The glass envelope 74 may be surrounded by a magnetic coil 75. An application of the control voltage to the magnetic coil 74 will cause a displacement of the electron beam much in the manner illustrated, wherein the beam is deflected sufficiently so that under the maximum application of the control voltage to the coil 75, substantially no part of the electron beam impinges upon the signal grids 68. A greater or lesser degree of magnetic field applied by the coil 75 will provide the desired controlling effect on the magnitude of the signal transmitted by the vacuum tube.

In Fig. 7, there has been diagrammatically illustrated the invention as applied to a seismograph system in which the output from a geophone or detector 80 of seismic waves applies seismic signals by way of a coupling transformer 81 to a potentiometer 82 connected to the input circuit including the control grid 25 of the tube 26 and ground. The seismic signals, after amplification in the tube 26, are applied through the coupling capacitor 43 to one or more similar stages as indicated by the rectangle 83; that is, stages similar to the one illustrated by the tube 26. The output from the several amplification stages is applied to a recorder 84 of the usual type used in producing seismograms. The amplified seismic signals are applied by way of conductors 85 and 86 to a rectifier 87, the filtered output of which is applied to the gain control electrode 39 by way of conductor 88. Similarly, the output of the rectifier is applied by conductor 89 to the second stage and to other stages symbolically represented by the rectangle 83. The magnitude of the negative bias applied to the gain control rods or electrodes corresponding with the rod 39 of the tube 26 produces a deflection of the electron beam in accordance with change in the amplitude of the signals applied to the rectifier 87. Thus, the system includes desirable features of an automatic volume control system and reduces the dynamic range of the signals applied to the recorder 84.

In Fig. 8, there is diagrammatically illustrated a system suitable for use with the beam-deflecting coil 75 of Fig. 6. Since the system of Fig. 8 includes features of the other forms of the invention, the same reference characters have been used to identify like parts. As shown, there may be one or more amplifier stages 90 of conventional or similar form following the stage or tube 74. While a bias or potential which varies in accordance with the amplitude of the seismic signals may be derived from one of the later stages and applied to the suppressor grid 91 of a pentode tube 92, the entire control or part of it may be derived from a master control system designated at 93. Such a master control may be of the type disclosed in Minton et al. Patent No. 2,301,739, where the gain of the pentode 92 is controlled by means of the bias applied between the suppressor grid 91 and the cathode. Conventional decoupling means 94 and 95 are provided. The coil 75 is connected to B+ and to the screen grid 96 of the tube 92, and therefore produces a gain-changing effect upon tube 74 in response to change in the screen-grid current of the tube 92. Since this current rapidly rises as the bias on the suppressor grid 91 is made negative with respect to the cathode, a substantial current change is produced in the coil 75 to provide a fast-acting deflection of the electron beam in manner already described in connection with Fig. 6. The gain controlling bias on the suppressor grid 91 therefore varies from a negative value to zero, or a slightly positive value as the amplitude of the seismic signals decreases.

The systems of Figs. 7 and 8 are to be taken as suggestive of other systems since many modifications may be made without departing from the scope of the appended claims.

What is claimed is:

1. A signal transmission circuit comprising an electron beam vacuum tube having a signal grid and means in said electron beam for deflecting the electron beam away from said signal grid, an input circuit connected to said signal grid, a source of gain control voltage connected to said deflecting means, and an output circuit connected to the anode of said tube.

2. A signal transmission circuit comprising an electron beam vacuum tube having electron beam forming means, a signal grid, a non-signal grid, a screen grid, a suppressor grid, an anode, an electric means within said tube for deflecting the electron beam away from said signal grid and toward said non-signal grid, an input circuit connected to said signal grid, a source of variable direct current voltage connected to said deflecting means to control the gain of said circuit, and an output circuit connected to the anode of said tube.

3. A signal transmission circuit comprising an electron beam tube having two grids located equidistant from the cathode, means for applying a signal to only one of said grids, similar circuit means interconnecting each grid with the cathode, means interposed between said grids and the cathode for deflecting the electron beam away from said signal grid, and a source of gain control potential connected to said deflecting means.

4. A signal transmission circuit comprising a vacuum tube having an anode, a suppressor grid therefor, a cathode, means for forming an electron beam, two grids located equidistant from the cathode, a screen grid for said grids, an electrostatic electrode located between said cathode and said two grids, means for applying a signal to only one of said grids, similar circuit means interconnecting each of said grids with the cathode, and means for applying to said electrostatic electrode a variable direct current control potential to control the gain of said circuit.

5. A signal transmission circuit comprising a vacuum tube having an anode, a suppressor grid therefor, a cathode, means for forming an electron beam, two grids spaced from the cathode, a screen grid for said grids, an electrostatic electrode located between said cathode and said two grids, means for applying a signal to only one of said grids, similar circuit means interconnecting each of said grids with the cathode, and means for applying to said electrostatic electrode a potential for deflecting the path of the electron beam from one grid to the other thereby to control the gain of said circuit.

6. A signal transmission circuit comprising a vacuum tube having a variable transconductance constant anode current characteristic, said vacuum tube including two grids spaced from the cathode, electron beam forming means, and means within said tube for deflecting the electron beam from one grid to another, means for applying a signal to only one of said grids, similar circuit means interconnecting each grid with the cathode, and an output circuit connected to the anode of said vacuum tube.

7. A signal transmission circuit comprising an electron beam vacuum tube having two grids spaced from the cathode, means for applying a signal to only one of said grids, and an electrical element within said tube and in the path of the electron beam, a control voltage source connected to said element for deflecting said electron beam from one grid to another thereby to produce relative to one of the grids a variable transconductance characteristic without varying substantially the anode current of said tube due to said deflection of said beam.

8. A signal transmission circuit comprising a vacuum tube having an anode, a cathode, means for forming an electron beam, a signal grid, a screen grid, and an electrostatic electrode located between said cathode and said signal grid, and means including circuit connections for applying to said electrostatic electrode a variable direct current control potential to cause it to cast an electron shadow on said signal grid when at a potential negative to said cathode and to control the magnitude of the electron shadow cast.

9. A signal transmission circuit comprising a vacuum tube having an anode, a cathode, means for forming an electron beam, two grids located equidistant from the cathode, an electrostatic electrode located between said cathode and said two grids in the normal path of the electron beam, means for applying a signal to only one of said grids, and means for applying to said electrostatic electrode a potential for deflecting the path of the electron beam so that said signal grid receives a controlled amount of the electron beam.

10. In an amplifier for a recording seismograph, a signal transmission circuit comprising an electron beam vacuum tube having an anode and two grids spaced from the cathode, means for applying a signal to only one of said grids, means intermediate said cathode and said grids for deflecting the path of the electron beam from one grid to the other thereby to produce relative to the signal grid and anode a variable transconductance characteristic without varying substantially the anode current of said tube due to said deflection of the path of said beam, and means operable with attenuation of said seismic signals for controlling said deflecting means to increase the amplification of said tube without distortion of said signals due to the increased amplification thereof.

11. An amplifier system providing for variable signal gain without introduction of modulation by variation of gain comprising an electron beam tube having a cathode, an anode continuously receiving the total beam, a grid for modulating that proportion of the total beam which passes through it and field-producing means between said cathode and said signal grid for varying said proportion of the beam traversing said grid, a signal input circuit connected to said grid to modulate said proportion of the beam at signal frequencies, a gain control circuit connected to said field-producing means to vary the proportion of the beam modulated at signal frequencies by the grid and during continued reception by the anode of the total beam, and a signal output circuit connected to said anode for traverse by output current whose average value is constant for different magnitudes of the signal and of the gain control voltage and whose alternating component corresponds only with the signal.

12. A variable-gain amplifier system comprising an electron beam tube having a cathode, a grid, an anode and means within said tube for deflecting the electron beam away from said grid, a signal input circuit connected to said grid to modulate only that portion of the beam passing through said grid to said anode, a source of gain control voltage connected to said deflecting means to vary that proportion of the beam which passes through said grid to reach said anode, and an output circuit connected to said anode for traverse by output current whose average value is constant for different magnitudes of the signal and of the gain control voltage and whose alternating component corresponds only with the signal.

13. In an amplifier for a recording seismograph, a signal transmission circuit for seismic signals comprising an electron beam tube having an anode, a cathode, means for forming an electron beam, and two grids located equidistant from the cathode, means for applying a seismic signal to only one of said grids, similar circuit means interconnecting each grid with the cathode, means interposed between said grids and the cathode for deflecting the electron beam away from said signal grid thereby to produce relative to the signal grid and anode a variable transconductance characteristic without varying substantially the anode current of said tube due to said deflection of the path of said beam, and a source of gain control potential connected to said deflecting means to control the extent of deflection of said beam.

14. In an amplifier for a recording seismograph, a signal transmission circuit for seismic signals comprising a vacuum tube having a cathode, an anode disposed in encircling relation about said cathode, a signal grid and a non-signal grid located equidistant from the cathode and between it and said anode, means forming an electron beam directed toward one of said grids, an electrostatic electrode disposed between said cathode and at least one of said grids in the normal path of the electron beam, means for applying seismic signals to said one of said grids, and means for applying to said electrostatic electrode a potential for deflecting the path of the electron beam so that said signal grid receives a controlled amount of said beam to produce relative to said signal grid and said anode a variable transconductance characteristic without varying substantially the anode current of said tube due to said deflection of the path of said beam.

GEORGE B. LOPER.

REFERENCES CITED

The following references are of record in the file of this patent:

UNITED STATES PATENTS

| Number | Name | Date |
|---|---|---|
| 2,171,490 | Dalpayrat | Aug. 29, 1939 |
| 2,172,859 | Toulon | Sept. 12, 1939 |
| 2,201,695 | Jonker | May 21, 1940 |
| 2,221,744 | Henry | Nov. 12, 1940 |
| 2,225,689 | Demuth | Dec. 24, 1940 |
| 2,273,142 | Roberts | Feb. 17, 1942 |